(12) United States Patent
Singh

(10) Patent No.: US 6,571,749 B2
(45) Date of Patent: Jun. 3, 2003

(54) COMPUTER CONTROLLED SIX-STROKE CYCLE INTERNAL COMBUSTION ENGINE AND ITS METHOD OF OPERATION

(76) Inventor: Satnarine Singh, 63 La Plaisance Road, La Romain, Trinidad (KN)

( * ) Notice: Subject to any disclaimer, the term of this patent is extended or adjusted under 35 U.S.C. 154(b) by 0 days.

(21) Appl. No.: 10/007,012

(22) Filed: Nov. 5, 2001

(65) Prior Publication Data

US 2002/0043222 A1 Apr. 18, 2002

Related U.S. Application Data

(63) Continuation-in-part of application No. 09/465,329, filed on Dec. 17, 1999, now Pat. No. 6,311,651.

(51) Int. Cl.⁷ ............................................. F02B 47/02
(52) U.S. Cl. ...................................... 123/25 C; 123/64
(58) Field of Search ................................. 123/25 C, 64

(56) References Cited

U.S. PATENT DOCUMENTS

| | | | | |
|---|---|---|---|---|
| 2,671,311 A | * | 3/1954 | Rohrbach | 123/25 C |
| 3,964,263 A | * | 6/1976 | Tibbs | 123/25 C |
| 4,736,715 A | * | 4/1988 | Larsen | 123/25 C |
| 4,976,226 A | * | 12/1990 | Herman | 123/25 C |
| 6,095,100 A | * | 8/2000 | Hughes | 123/25 C |
| 6,112,705 A | * | 9/2000 | Nakayama et al. | 123/25 C |
| 6,311,651 B1 | * | 11/2001 | Singh | 123/25 C |

* cited by examiner

Primary Examiner—Marguerite McMahon
Assistant Examiner—Jason Benton
(74) Attorney, Agent, or Firm—Malloy & Malloy, P.A.

(57) ABSTRACT

An internal combustion engine and its method of operation which is designed to operate on a six-stroke cycle and which may include at least one but preferably a plurality of piston and cylinder assemblies each of which are characterized by a cylinder having a piston reciprocally mounted therein and intake an exhaust valves cooperatively mounted to regulate fluid flow into and out of the cylinder. An injection assembly is connected to each of the piston and cylinder assemblies and structured to inject water into the cylinder during a predetermined portion of the six-stroke cycle. A central processor is at least partially responsive to data received from a sensor assembly associated with on the internal combustion engine at strategic locations so as to determine the energy content within the one or more cylinders and thereby regulate and control the timing and quantity of the injected water. The injected water gradually converts to steam without first exhausting the ignited air fuel mixture, thereby generating an additional power stroke.

14 Claims, 2 Drawing Sheets

COMPUTER CONTROLLED SIX-STROKE CYCLE INTERNAL COMBUSTION ENGINE AND ITS METHOD OF OPERATION

CLAIM OF PRIORITY

The present application is a continuation-in-part application of previously filed, now pending application having Ser. No. 09/465,329, filed on Dec. 17, 1999, which will mature into U.S. Pat. No. 6,311,651 on Nov. 6, 2001 and which is incorporated herein in its entirety by reference.

BACKGROUND OF THE INVENTION

1. Field of the Invention

This invention relates to a computer controlled, internal combustion engine designed to operate on a six-stroke cycle, wherein water is injected into each of the one or more cylinders during a predetermined portion of the six-stroke cycle depending upon the energy content within the cylinder subsequent to ignition of the conventional air-fuel mixture. The residual heat from the ignited air-fuel mixture serves to convert the injected water into steam on a controlled basis, thereby creating an auxiliary power stroke.

2. Description of the Related Art

It is well known that for over a hundred years the internal combustion (IC) engine was and is the dominating source of power for motorized vehicles. Other than rotary engines, the typical IC engine incorporates a plurality of piston and cylinder assemblies each of which includes a cylinder having a piston reciprocally mounted therein and wherein a combustible fluid, such as an air-fuel gaseous mixture, is forced into the interior of the cylinder, compressed and subsequently ignited. The ignition of the combustible fluid causes a significant expansion of gases within the cylinder, resulting in the piston being forced downwardly within the cylinder and thereby, defining what is commonly known as a "power stroke". The piston is drivingly connected to a crank shaft which is drivingly connected to the remainder of the drive train associated with the motorized vehicle.

Over the years, numerous attempts have been made to increase the efficiency of IC engines, while at the same time protecting the environment by eliminating or significantly reducing the exhausting of pollutants into the surrounding atmosphere. Attempts to protect the environment, have resulted in significant improvements in exhaust systems, fuel compositions and other operational components of modern IC engines, which sometimes derogatorily affect the efficiency or performance characteristics of such engines. Other attempts to improve the performance of IC engines, without harming the environment, have the included the design of an IC engine which operates on a six-stroke cycle. In such designs, the first four strokes function as a conventional internal combustion engine and include an intake stroke, compression stroke, power stroke and exhaust stroke. The last two strokes of the six-stroke cycle include the injection of water into the combustion chamber for purposes of converting the water to steam by using the residual heat remaining therein. The expansion of the steam is intended to provide an additional power stroke, without additional fuel or combustible fluid being supplied. However, for the most part, such known attempts have failed to provide an internal combustion engine capable of operating on a six-stroke cycle, which is sufficiently efficient and effective for wide spread commercial use.

In order to understand the problems associated with the effective development of an IC engine of the type set forth above, it is important to understand the relationship between water, steam, temperature and pressure, all of which are governed by the laws of thermodynamics, and more specifically, by what are commonly referred to as the "Steam Tables". Accordingly, and based on these laws, it is well recognized that in a closed container or system, for example, heated water will be maintained in a liquid state at a temperature of 297 degrees Fahrenheit, only as long as the pressure is maintained at a minimum of 50 PSI. However, if the heated water were suddenly to be released from the closed container into atmosphere it would immediately "flash" into steam due to the significant drop in pressure. The reason for this instant conversion into steam is because the water has sufficient latent heat for the steam conversion and no longer has to absorb heat from an exterior source.

Prior attempts to take advantage of the force generated when the water converts to steam in the combustion chamber or cylinder an IC engine have, for the most part, failed due to the fact that the water was injected and allowed to convert or "flash" into steam at the wrong time during the six-stroke cycle. Allowing all of the water injected into a cylinder to simultaneously flash into steam would most probably result in damage to the engine due to the "instant" expansion force created. Rather than developing a power stroke in the engine, such an expansive force would have a tendency to crack the engine block or cause a failure in the seals between the piston and the interior surface of the cylinder. Accordingly, it is believed by the inventor hereof that in order to develop an efficient IC engine incorporating the conversion of injected water into steam, the conversion should be controlled and take place continuously or gradually over the duration of a specific predetermined portion of the six-stroke cycle, rather than instantaneously upon injection of the water into the cylinder.

The failure of previous attempts at water to steam conversion is further evidenced by an explanation of the ignition of a conventional air-fuel mixture in a conventional IC engine. More specifically, after the air-fuel mixture is compressed and ignited, the mixture burns and expands, thereby supplying a continuous force which drives the piston the length of the cylinder resulting in a "power stroke". This happens because the combustion of the air-fuel mixture occurs on a substantially continuous basis as the piston travels the length of the cylinder during the power stroke. All of the force or power resulting from the ignition of the air-fuel mixture is not released or exerted on the piston at one point in time. Therefore, it is believed by the inventor hereof that the control of the conversion of water into steam should similarly occur on a continuous rather than an instantaneous basis in order for such conversion to produce an effective and efficient additional power stroke in a six-stroke cycle.

Another characteristic common to known attempts to develop a six-stroke cycle IC engine is the premature exhausting of the conventional air-fuel mixture after it has been ignited. It is generally accepted that approximately 30% of the energy (heat) of the fuel charge is lost in the exhaust gases due to inherent designs of known or substantially conventional IC engines. However, if the exhaust gases can be maintained within the cylinder and properly mixed with a quantity of water being injected, the heat energy still remaining in the previously ignited fuel charge can be utilized to add another power stroke, occurring upon the conversion of water into steam within the cylinder.

Based on the above, there is a significant and recognized need for the development of an improved internal combustion engine which is capable of efficiently operating on a six-stroke cycle which includes the development of an additional power stroke through the injection of water into the cylinder or combustion chamber and the conversion of water into steam. The water to steam conversion should occur on a controlled basis and be at least partially dependent on the energy content within the cylinder, subsequent to ignition of a conventional air-fuel mixture and prior to the ignited air-fuel mixture being exhausted. Any such improved internal combustion engine should preferably have the injection of water and its conversion into steam controlled by a computer assembly or central processor, properly programmed in accordance with the related laws of thermodynamics and the conversion of water to steam in accordance with the "Steam Tables".

SUMMARY OF THE INVENTION

The present invention is directed towards a computer controlled internal combustion (IC) engine, and its method of operation, designed to operate on a six-stroke cycle and specifically includes the injection of water into the combustion chamber or cylinder of each of a plurality of piston and cylinder assemblies, during a predetermined portion of the six-stroke cycle. More specifically, the quantity and timing of the water injection is controlled and regulated to the extent that the injected water is prevented from turning into steam even after reaching sufficiently high temperatures because of the continuously increasing pressure within the cylinder, due to the compression of gases therein, to the extent that the water is maintained in a liquid state until the beginning of an intended "auxiliary" power stroke.

More specifically, the IC engine of the present invention comprises at least one, but preferably a plurality of piston and cylinder assemblies. Each such piston and cylinder assembly includes a cylinder which serves as a combustion chamber having a piston reciprocally mounted therein, and further including intake and exhaust valves associated therewith so as to regulate the flow of fluid into an out of the cylinder. A source of ignition is also connected to each chamber and may be in the form of a spark plug, glow plug or any other applicable and/or conventional means of igniting a combustible fluid, such as a gaseous mixture of fuel and air.

In addition to the above, the improved IC engine of the present invention includes an injection assembly comprising one or more injector structures associated with each of the cylinders and disposed and structured to inject predetermined quantities of water at predetermined rates and times into the individual cylinders under the control and regulation of a central processor. A central processor or computer of the general type referred to is known in the automobile and/or internal combustion engine industry for the control and regulation of a variety of operating conditions of the IC engine. The central processor of the present invention is responsive to a plurality of sensors, all of which serve to define a sensor assembly, which sense and/or determine certain predetermined physical characteristics relating to the operation and performance of the engine.

As will be explained in greater detail hereinafter a variety of physical characteristics determined by the plurality of sensors may be used to determine the "energy content" within the cylinder during a predetermined portion of the six-stroke cycle. In turn, the energy content of a cylinder is used in determining the quantity and duration of water injection into the cylinder. Such physical characteristics may include, but are not limited to, the pressure and temperature of the interior of each cylinder at a first predetermined portion of the six-stroke cycle. The determination of the pressure and temperature may be used in the calculation of the energy content within the cylinder during a portion of the six-stroke cycle and is subject of U.S. Pat. No. 6,311,651 by the inventor hereof, which is incorporated in its entirety herein by reference.

In addition, one or more of the plurality of sensors are mounted on the engine to determine the engine speed as well as the temperature of the water being injected into the cylinder prior to its injection. The determination of the engine speed by the sensor assembly will, in turn, inform the central processor of the rate of travel of the pistons within respective ones of the cylinders. Since it is important that water, when injected into the cylinder absorb the maximum amount of heat without turning into steam, the determination of the central processor of the rate of travel of the piston within the cylinder will allow the central processor to determine the length of time a predetermined stroke exists. This in turn will allow the central processor to inject water into the cylinder at a time during a predetermined stroke that will allow the injected water to spend the maximum amount of time in the cylinder and thereby absorb the maximum amount of heat, without turning into steam. Informing the central processor of the amount of time the various quantities of injected water spend in the cylinder, absorbing heat, better assures that maximum heat energy is extracted, thereby resulting in a more efficient auxiliary power stroke being subsequently produced. The temperature of the water prior to it being injected into the cylinder will also be communicated to the central processor so as to aid in the calculation of the amount of heat required to convert the water into steam specifically during the second predetermined portion of the sixth stroke cycle.

The central processor will thereby be informed of the operating and performance characteristics of the IC engine under varying speed and load conditions. Such operating conditions will, of course, have a direct effect on the physical conditions within each of the cylinders during the operation of the IC engine. As a result the "energy content" of each cylinder, immediately prior to and during the injection of water into the cylinder will be determined at least partially by the central processor in order to determine the quantity of water to be injected into the cylinder as well as the time and duration of such injection.

More specifically, the quantity of water to be injected can be calculated based on the amount of heat required to convert it to steam. Also, the amount of water to be injected will be determined by the temperature of the water before its injection into the cylinder. It should be apparent that the higher the temperature of water being injected into the cylinder the greater the quantity of water that can be injected, in that less heat will have to be absorbed from the "energy content" of the interior of the cylinder into which the water is to be injected, to convert the injected water into steam.

Another directly related responsibility of the central processor is to calculate when or over what duration of the six-stroke cycle is the water to be injected. The timing of the water injection is important in order to prevent the water from being converted into steam during the compression stroke upon its injection into the cylinder. More specifically, as the water is injected, its temperature significantly and rapidly increases. Accordingly, the pressure exerted on the injected water must also significantly and proportionally increase in order to prevent the formation of steam.

As set forth above, the inventor herein described in detail in the above noted U.S. Pat. No. 6,311,651 that the "energy content" was capable of being determined by the on-board processor using physical parameters of the engine which included the temperature, pressure and volume of the cylinder. However, as an alternate and preferred embodiment to the invention described in the aforementioned patent, energy content or "remnant energy" may be determined in a different manner with minimal or no significant modification to the software of the on-board processor.

Accordingly, in the preferred embodiment of the present invention, the determination of the energy content or remant energy within a given cylinder is derived by what may be generally referred to as a "default" determination or computation. As will be described in greater detail hereinafter, a key element in this default determination is the recognition of a predetermined value of the thermal efficiency of a particular IC engine operating under various load conditions. It is universally recognized that the thermal efficiency is the quantity of heat that is converted to motive force at the wheels of the vehicle. Further, the average thermal efficiency of an internal combustion engine is generally recognized as being generally in the range of 40%. A more precise thermal efficiency value can of course be provided, such as by the manufacturer of the engine. Accepting this 40% value for purpose of clarity, leads to the conclusion that generally 60% of the heat or energy goes to waste. In turn, the waste heat is distributed between exhaust gasses, heat detracted by the cooling system and a certain amount of loss due to friction.

Therefore, as part of the aforementioned default computation, it is understood that a predetermined amount of heat energy created by the fuel injected into a cylinder is exhausted, in a conventional four stroke cycle engine, in the fourth or exhaust stroke. As a result, the energy content can be determined, by "default" once it is recognized that the thermal efficiency of the engine has a predetermined recognized value as well as the fact that generally half of the heat energy lost is in the gasses that are exhausted. Accordingly, the energy content during the third stroke of the six-stroke cycle engine, of the present invention, can be accurately and simply determined by "default", after ignition and expansion of the substantially standard fuel/air mixture.

Further, in this preferred embodiment of the present invention, the end of the third stroke represents the beginning of the second predetermined portion of the cycle of the sixth stroke cycle engine, during which the injection of water begins. This of course differs from the injection of water only during the fourth stroke, as described in detail in the above noted U.S. Pat. No. 6,311,651 by the inventor herein.

During the fourth stroke or subsequent compression stroke, the piston is rising through the cylinder so as to compress its contents, including both the combustible fluid, which had already been ignited, and the water being injected. Therefore, as the water is continuously and/or periodically being injected, in an amount based on the aforementioned "energy content" of the cylinder, during a portion or at least a majority of this compression stroke, the pressure thereon is continuously increasing. The injection of the water in a regulated and controlled manner by the central processor, as set forth above, will force the water to be maintained in a liquid state and prevent its conversion into steam until the beginning of the following power stroke. This following stroke will define an "auxiliary" power stroke because of a forced travel of the piston upon the conversion of the water into steam. The result will be a gradual decrease in pressure as the piston moves towards its bottom dead center (BDC) position during this auxiliary power stroke. Therefore, subsequent to the compression of the ignited combustible fluid and the injected water, the piston will began its travel from its top dead center (TDC) position to the BDC position with the resulting gradual decrease in pressure on the injected water. Accordingly, there will be a continuous or gradual conversion of the water into steam because of the pressure reduction thereon and the fact that the water has absorbed sufficient heat from the "energy content" within the cylinder into which it is being injected to accomplish the water to steam conversion. As set forth above, this conversion will generate an auxiliary power stroke as the piston is forced to travel from its TDC position to its BDC position.

Therefore, the improved IC engine of the present invention will allow the development of significantly more power from relatively smaller size engines while operating at an increased efficiency level. The increase in efficiency will be due to the development of two power strokes using the same amount of combustible fluid or air-fuel mixture. The admission of pollutants into the atmosphere will also be reduced since the exhausting of the previously ignited combustible fluid only occurs at the end of the six-stroke cycle, along with the steam. Further, the resulting IC engine can operate on a lower compression ratio, thereby eliminating the necessity of using more expensive, high octane fuels. In addition to the above, the computer controlled IC engine of the present invention will be environmentally friendly by enabling the use of less combustible or fossil fuel, while allowing the engine to do a greater amount of work.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed towards a computer controlled internal combustion (IC) engine, and its method of operation, wherein the IC engine is designed to operate on a six-stroke cycle and provide an auxiliary power stroke through the regulated injection of water into the combustion chamber or cylinder of one or more piston and cylinder assemblies of the engine and the conversion of the injected water into steam. It is emphasized that while the present invention will be explained primarily with reference to a single piston and cylinder assembly having an at least partially conventional design, the computer controlled IC engine of the present invention may be of the type incorporating one or a plurality of such piston and cylinder assemblies and may be specifically adapted for use as the power source in an automobile, truck or other motorized vehicle.

Figure 1:
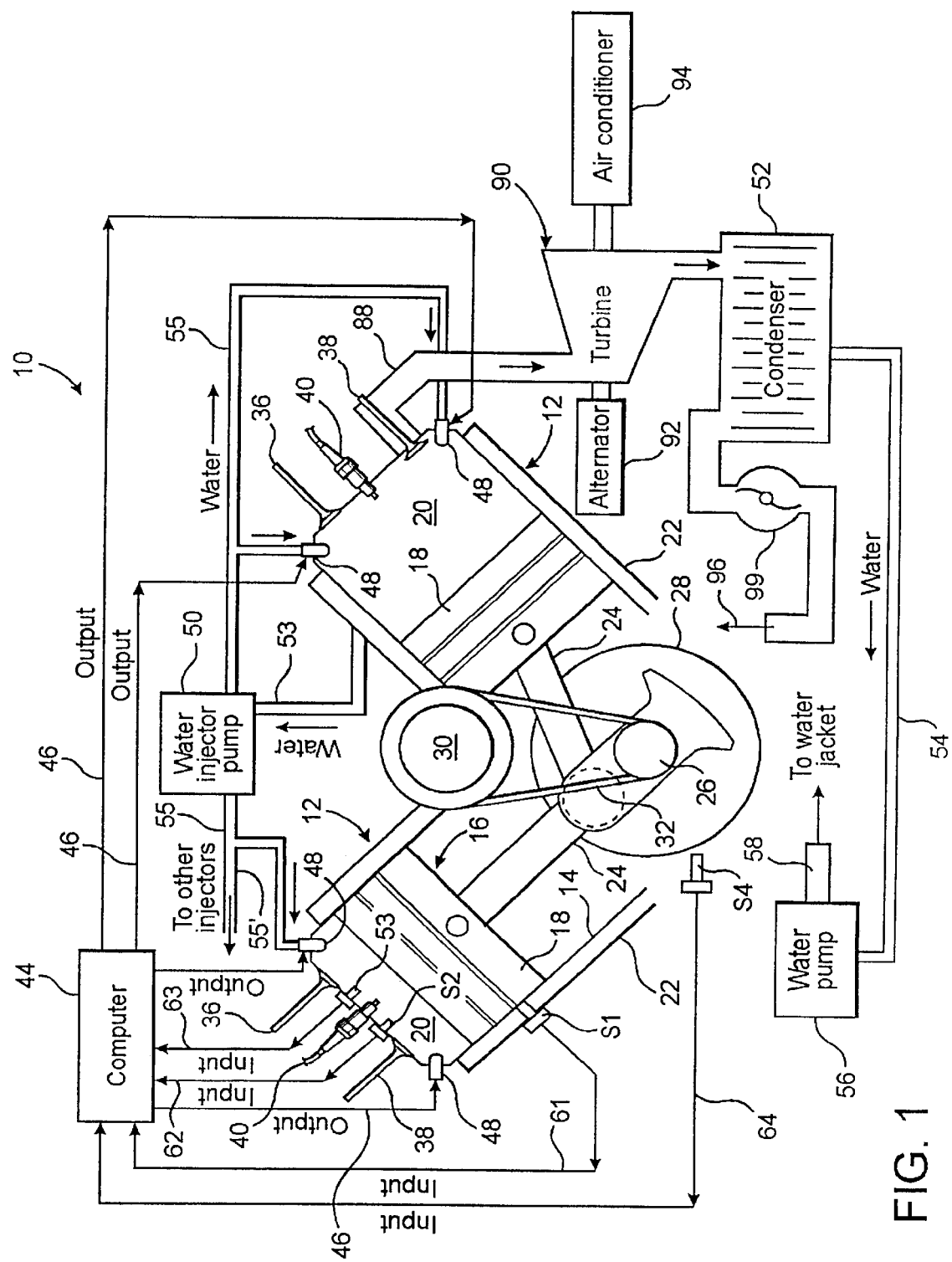
FIG. 1 is a schematic representation of various operative components of a computer controlled internal combustion engine according to the present invention.

With reference to the accompanying Figures, the IC engine of the present invention has a plurality of operative components schematically represented in FIG. 1 and collectively indicated as 10. The IC engine 10 comprises preferably a plurality of piston and cylinder assemblies generally indicated as 12 which include a cylinder 14 having a piston 16 including piston head 18 reciprocally mounted within the interior 20 of the cylinder 14. A water jacket 22 is disposed in surrounding relation to the cylinder 14 and is designed to have a quantity of water circulating there through so as to provide proper cooling to each of the piston and cylinder assemblies 12. The piston heads 18 are connected by piston shafts 24 to a driven crank shaft 26 attached to fly wheel 28. In addition, a cam shaft 30 is driven by an interconnecting belt or like structure 32 and is rotated or driven at an applicable gear ratio, such as a preferred ratio of 3 to 1. In addition, each of the piston and cylinder assemblies 12 includes an intake valve 36 and an exhaust valve 38 cooperatively structured to regulate fluid flow into an out of the interior 20 of the cylinder 14. An ignition source 40 may be in the form of a spark plug, glow plug or any other means for igniting a combustible fluid, such as a conventional air-fuel gaseous mixture, in an internal combustion engine.

The IC engine, as described above, will operate in a conventional fashion through the first three strokes of the aforementioned six-stroke cycle to the extent that a combustible air-fuel gaseous mixture will be forced into the cylinder interior 20 by appropriate structure (not necessary to be shown as this is within the knowledge of persons of skill in the art), where it will be compressed and subsequently, ignited by the ignition source 40. Upon ignition, the expansion of the ignited gasses will cause the piston 18, in each of the cylinders 14, to be driven downwardly from its top dead center (TDC) position to its bottom dead center (BDC) position, thereby defining a power stroke. The power stroke drives the crank shaft 26 and fly wheel 28 and provides moving force to the vehicle in which the IC engine 10 is mounted.

With further reference to FIG. 1, important operative components of the present invention include a computer or central processor 44 which is interconnected by outputs 46 to a plurality of injector structures 48. Each of the cylinders 14 has at least one, but preferably, a plurality of the injector structures 48 mounted thereon in direct fluid communication with the cylinder interior 20. The injector structures 48 are designed to direct water at prescribed times and in a prescribed manner into the cylinder interiors 20. As will be explained in greater detail hereinafter, the water may be injected in small amounts or "periodically" during a predetermined portion of the six-stroke cycle.

The water to be injected is preferably supplied from the water circulating through the water jackets 22 surrounding each of the cylinders 14. The water jackets 22 may comprise a part of a water supply and what may be referred to as a closed water system. The term "closed water system" refers to the fact that the water injected into the interior 20 of each of the cylinders 14 is retrieved and recirculated so as to flow back into the interior of the water jackets 22 to maintain the predetermined lower temperature of the cylinders 14. As will be explained in greater detail hereinafter, the closed water system also includes a water injector pump 50 connected by appropriate ducting 55 between the one or more water jackets 22 and each of the injector structures 48. The closed water system further preferably includes a condenser 52 designed to receive steam from the exhaust exiting each of the cylinder interiors 20, through outlet 88. The condenser 52 collects the water recovered by condensing the retrieved steam and forces it through return line 54 by means of a water return pump 56. The water is further directed by conduits 58 back to each of the one or more water jackets 22, thereby further defining the aforementioned closed water system.

As set forth above, one inventive feature of the present invention is the injecting of the water in specific quantities and during a specific portion of the six-stroke cycle, wherein the amount and time of water injection for each cylinder is controlled by the central processor 44. In order to aid in the determination of at least some of the parameters as set forth above, a sensor assembly is mounted on the various operative components of the IC engine 10 and is structured to determine certain physical characteristics of the engine. Further, the sensor assembly transmits the sensed or determined data to the central processor 44 for processing. Accordingly, the sensor assembly of the present invention comprises at least one, but preferably, a plurality of sensor structures mounted at various locations on the IC engine 10 and which are specifically structured to sense and determine specific, predetermined physical characteristics required for appropriate calculation by the central processor 44.

The plurality of sensors of the sensor assembly includes a sensor structure $S_1$ mounted in the vicinity of the water jacket 22 and structured to determine the temperature of the water prior to it being injected into the cylinder interior 20. The temperature of the water prior to injection is important because the greater the temperature of the water to be injected the greater quantity of water that can be injected because less heat is required to be absorbed from the "energy content" of the cylinder to convert the water into steam. More specifically, the hotter the water being injected, the less amount of heat or energy need be taken from the interior of the cylinder, subsequent to the combustible fluid being ignited, in order that the water be converted into steam in a controlled manner, as will be explained in greater detail hereinafter.

The sensor assembly of the present invention also includes at least one but preferably a plurality of additional sensor structures $S_2$ and $S_3$ both of which may be mounted in the same cylinder interior 20 or each of which may be mounted in a different cylinder interior. Therefore, the temperature and pressure of the cylinder interiors 20 of the various piston and cylinder assemblies 12 may also be determined and directed to the central processor 44 for further processing. As set forth above the temperature and pressure of the cylinder interior are primarily used in determining the "energy content" of the cylinder immediately prior to the injection of water therein, when practicing an alternate embodiment of the present invention disclosed and claimed in the above noted patent, by the inventor herein.

While the determination of the energy content in the preferred embodiment as described hereinafter differs from that of the above noted patent, it is emphasized that the determination of the energy content will directly affect the quantity of water being injected as well as the time and/or duration such water injection will take place during a predetermined portion of the six-stroke cycle. Also, a sensor structure $S_4$ is mounted on the engine in the vicinity of the fly wheel 28 and/or crank shaft 26 in order to determine engine speed. Engine speed is, of course, directly related to the speed of the travel of the piston head 18 within the cylinder interior, which in turn may be communicated to the central processor 44 so as to determine the length of time a particular stroke exists during the six-stroke cycle.

In order to obtain the maximum power from the auxiliary power stroke or fifth stroke, the injected water should remain within the cylinder a maximum amount of time, during the fourth stroke, so as to absorb a maximum amount of heat, without turning into steam during the fourth stroke. Heat absorption during the fourth stroke depends, at least in part, upon the length of time of the fourth stroke and that time is dependent on the time the piston head 18 takes to travel from its BDC position to its TDC position. The central processor 44 must be informed of the amount of time each injection of water spends in the cylinder absorbing heat, during the fourth stroke, without turning into steam, so that the maximum heat energy can be extracted, thereby assuring that a more efficient fifth stroke or auxiliary power stroke is produced. The length of time of the fourth stroke is measured by determining the engine speed which, as set forth above, is directly related to the time of travel of the piston head 18 from BDC to TDC. The data relating to engine speed, as determined by sensor structure $S_4$, is particularly important when the vehicle is operating at varying speed or load conditions. Such varying operative conditions will have a direct effect on the mass of combustible fluid forced into the interior 20 of each of the cylinders 14.

Interconnection between each of the plurality of sensor structures $S_1$, $S_2$, $S_3$, and $S_4$ is by means of any type of applicable electrical connection such as at 61, 62, 63 and 64 respectively. It should also be noted that for purposes of clarity, FIG. 1 depicts the various sensors $S_2$ and $S_3$ being mounted in operative position with regards to only a single cylinder interior 20. However, it is emphasized that an increased number of such sensor structures can be mounted in operative relation to each of the piston and cylinder assemblies 12 which are incorporated in the IC engine 10 of the present invention.

Figures 2A, 2B, 2C:
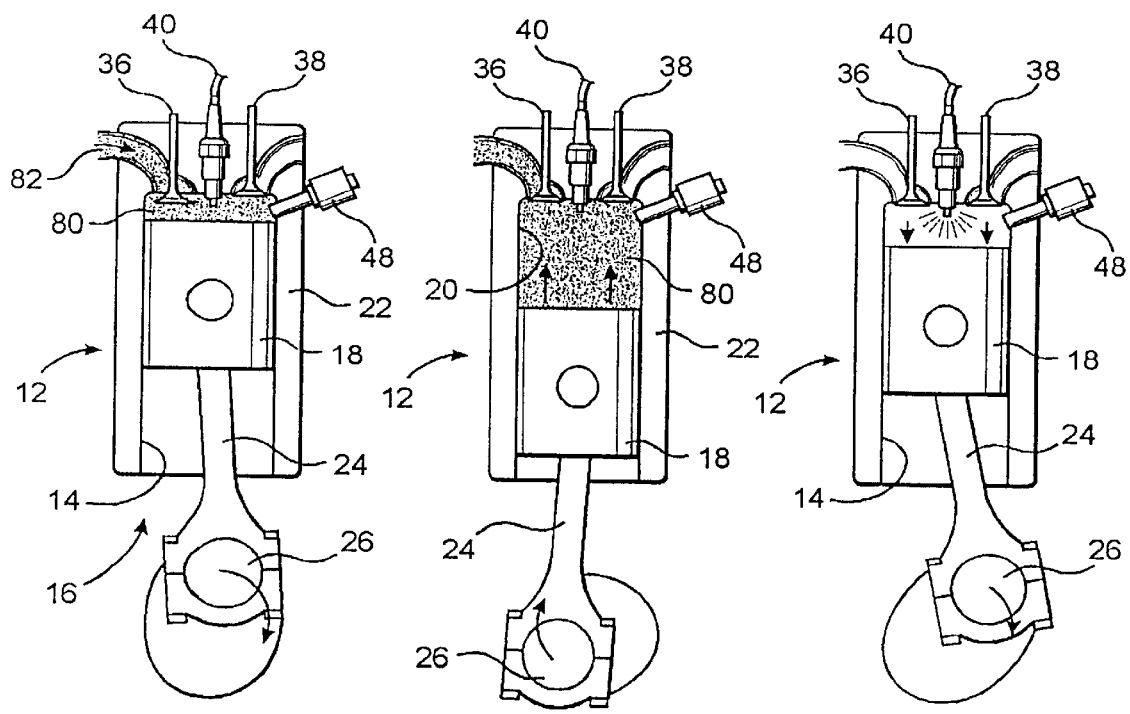
FIGS. 2A through 2F consecutively represent successive strokes of at least one of a plurality of piston and cylinder assemblies incorporated within the internal combustion engine of the present invention while operating on a six-stroke cycle.

FIGS. 2A through 2F, demonstrate the operation of the internal combustion engine 10, by a successive representation of each stroke of a six-stroke cycle, wherein the six-stroke cycle comprises a first intake stroke demonstrated in FIG. 2A. During the intake stroke, a combustible fluid 80, preferably in the form of an air-fuel gaseous mixture, is drawn into the interior of the cylinder 20 through inlet 82 upon an opening of the intake valve 36. As crank shaft 26 serves to rotate the piston 16, the piston head 18 travels along the length of the cylinder interior 20 until it reaches its Bottom Dead Center (BDC) position, which defines the beginning of a compression stroke, illustrated in FIG. 2B.

The compression stroke of the six-stroke cycle is characterized by the intake and exhaust valves 36 and 38 respectively, both being maintained in a closed position, such that the upward travel of the piston head 18 within the cylinder interior 20 will cause a compression of the combustible fluid 80 as the piston head 18 reaches its Top Dead Center (TDC) position at the beginning of a third or power stroke, represented in FIG. 2C. Upon compression being completed as the piston head 18 reaches TDC, the ignition source 40 will be activated to ignite the combustible fluid 80 forcing the piston head 18 downwardly into its BDC position and causing the forced rotation of the crank shaft 26. The BDC position of piston head 18 is represented in FIG. 2D.

Figures 2D, 2E, 2F:
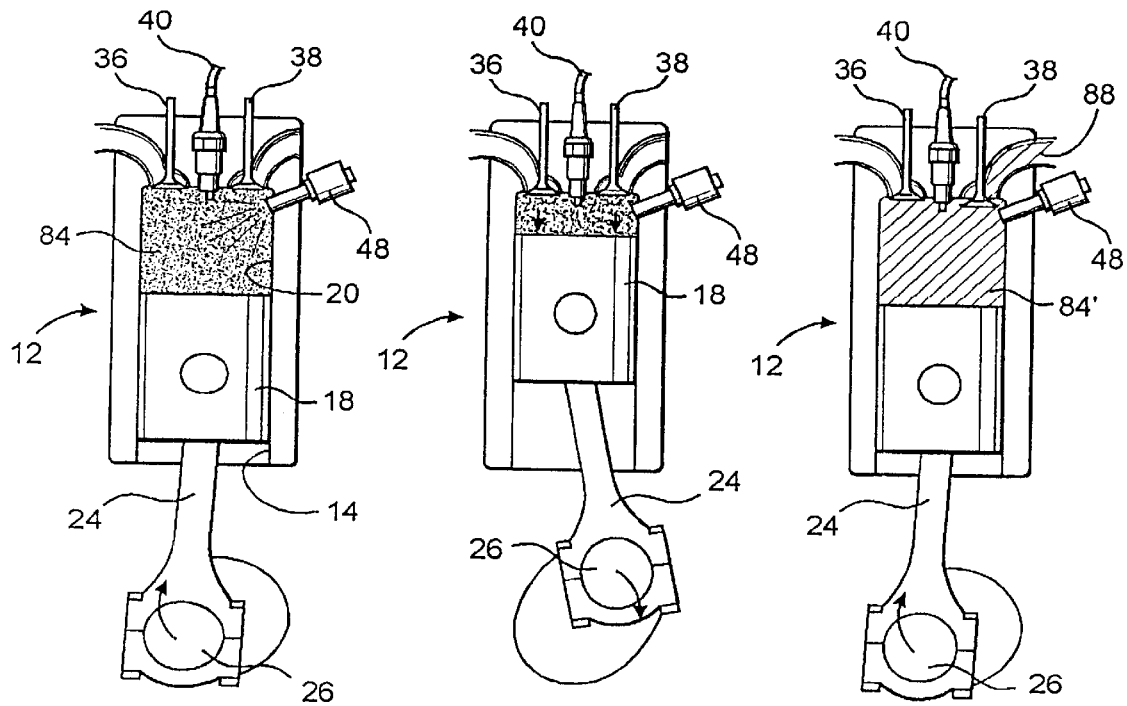

In this embodiment of the present invention, FIG. 2D is representative of both the end of the third stroke as well as the beginning of the fourth stroke of the six-stroke cycle. Accordingly, the internal combustion engine 10 of the present invention operates in a substantially conventional fashion through the first three strokes, represented by FIGS. 2A, 2B and 2C of the six-stroke cycle. Therefore the "energy content" of the interior 20 of each of the cylinders 14, starting generally at the end of the third stroke is to be determined for purposes of deciding the quantity and duration of water injection as emphasized herein.

As set forth above the preferred embodiment of the present invention comprises the determination of the energy content of each of the one or more cylinders utilizing a "default" determination or computation based on certain known or determined parameters including thermal efficiency on a particular IC engine and other related factors. More specifically, with any given IC engine the thermal efficiency, dependent in part on the variable operative conditions of the engine, is recognized as the quantity of heat that is converted to motive force at the wheels of the vehicle. The average thermal efficiency of an internal combustion engine is generally 40%. This means that approximately 60% of the heat goes to waste. Of the 60% of waste heat, half or 30% is lost in the exhaust gasses. An additional 25% is lost or removed by the cooling system associated with the engine. An additional 5% is lost due to friction. Therefore, by "default" we automatically know that generally about 30% of the heat of the fuel injected into any cylinder is lost with the exhaust gasses, in the conventional four stroke cycle engine, in the fourth or exhaust stroke. However it is recognized that in determining the parameters utilized in the default computation or determination of the energy content of a given cylinder, that the amount of heat lost to exhaust gasses may vary from the above noted 30%.

Therefore, applying the default determination of the preferred embodiment of the six-stroke cycle engine of the present invention, and with minimal or no modification to the software of the existing on-board computer, the "remnant" energy or energy content of a cylinder at the end of the third stroke may be automatically, simply and accurately determined at the moment the fuel is injected into the cylinder. More specifically, the default determination of the energy content or remnant energy of a given cylinder is as follows:

a) mass of fuel injected per cylinder x calorific value per unit mass=total energy input per cylinder.

b) total energy×thermal efficiency=motive force (horse power)

c) total energy×30% (recognized value of the heat loss to exhaust gasses)=remnant heat energy or energy content at the end of the third stroke.

As set forth above it is recognized that in a conventional four stroke engine, the beginning of the fourth stroke, immediately prior to the end of the third stroke, represents the beginning of the exhaust of the gasses in which 30% or a pre-recognized value of heat is loss. As set forth in detail herein the energy content of the cylinder is the value needed in determining a continuation of the forth and fifth stroke of the sixth stroke cycle of the present invention utilizing the controlled water to steam conversion. More specifically and as also emphasized herein the energy content of a given cylinder is determinative, along with other factors set forth herein, of the quantity and time period of water injected into the cylinder.

The fourth stroke comprises the piston head moving from a BDC position, representing the end of the third stroke, to a TDC position, thereby decreasing the volume within the cylinder interior 20 and resulting in an increased pressure on the water being injected into the cylinder interior 20. Accordingly, even though the temperature of the water being injected is increasing, the pressure is also increasing which, according to the aforementioned "Steam Tables" forces the water to be maintained in a liquid state as it is being continuously and/or periodically injected to the cylinder, preferably beginning at the end of the third stroke and during at least a majority of the duration of the fourth stroke represented in FIG. 2D. The water being injected is, therefore, prevented from turning into steam as soon as it is injected. In order to further assure proper and accurate determination of the energy content and as a result, both the quantity of water to be injected and the time or duration of water injection, the sensor structure $S_1$ further inputs into the central processor 44, the temperature of the water prior to it being injected. As set forth above, the hotter the water being injected the less amount of heat required to convert the water from water to steam and the greater amount of water that can be injected into the cylinder interior 20.

For purposes of clarity, the determination of the energy content is derived at what may be referred to as a first predetermined portion of the six-stroke cycle of the engine of the present invention. In addition, the water is injected, once the energy content of the cylinder has been determined, at the beginning of a second predetermined portion of the six-stroke cycle. Distinguishing the first and second predetermined portions of the six-stroke cycle from one another is of note since the energy content of a cylinder need be known preferably, immediately prior to injection of the water into the cylinder. Accordingly, the first predetermined portion of the cycle is herein defined as generally at the end of the third stroke and prior to the injection of water into the cylinder. Once the energy content of the cylinder is determined, the water is preferably injected at the end (BDC) of the third stroke and may continue during at least a portion or a majority of the fourth stroke. Therefore, the beginning of the injection of water at the end of the third stroke is herein defined as the second predetermined portion of the six-stroke cycle. It is again noted that this embodiment therefore differs from that disclosed in the above noted patent by the inventor herein, wherein the injection of water occurred in the second predetermined portion of the six-stroke cycle which was therein defined as the fourth stroke thereof.

Further, the pressure exerted on the injected water will be determined by the rate at which the cylinder interior 20 decreases in volume. This, of course, is directly proportional to the rate of the travel of the piston head 18 as it travels from its BDC position to its TDC position during the duration of the forth stroke. As set forth above, in order to absorb the maximum heat without turning into steam, the water must remain within the cylinder, during the fourth stroke for a maximum amount of time in that heat absorption in the fourth stroke depends, at least in part, upon the duration or length of time the stroke exists. This in turn depends upon the time it takes the piston head 18 to travel from its BDC position to its TDC position. Therefore, sensor structure $S_4$ is disposed and structured to determine the engine speed which is directly related to the rate of travel of the piston head 18 within the interior 20 of the cylinder 14 which is determinative of the time duration of the fourth stroke.

Upon reaching its TDC position at the beginning of the fifth stroke, as represented in FIG. 2E, the direction of the travel of the piston head 18 will reverse, traveling back towards its BDC position. The resulting increase in the volume of the cylinder interior 20 will decrease the pressure on the water injected during at least a majority of the duration of the fourth stroke (FIG. 2D). This decrease in pressure will allow the water to be converted into steam on a continuous basis as the pressure continuously decreases because of the downward travel of the piston head 18 within the cylinder interior 20, resulting in the auxiliary power stroke. Instantaneous "flashing" of all of the water injected during the end of the third stroke and during the fourth stroke as represented in FIG. 2D will be prevented since the pressure within the cylinder during the fifth, auxiliary power stroke represented in FIG. 2E, will be sufficient to maintain at least some of the water in a liquid state until the piston approaches the BDC position.

The sixth stroke represented in FIG. 2F is characterized as an exhaust stroke with the intake valve 36 maintained in a closed position and the exhaust valve 38 maintained in an open position, until the end of the sixth stroke. More specifically the combined steam and previously ignited combustible fluid 84' will be exhausted through outlet 88 upon an opening of the exhaust valve 38. It should be noted that the combustible fluid ignited during the initial power stroke, or stroke three, represented in FIG. 2C, will not be exhausted until the sixth stroke and will be exhausted from the interior of the cylinder 20 at the same time as the steam. With reference to FIG. 1, the exhausting of the steam and ignited combustible fluid will pass from outlet 88 to the exhaust system after having first passed through the condenser 52, as set forth above.

In summary, the central processor 44 accomplishes the following based on its responsiveness to some or all of the data received from the plurality of sensors $S_1$, $S_2$, $S_3$ and $S_4$ of the sensor assembly:

a) determines the "energy content" beginning at the end of the third stroke using the physical characteristics within the cylinder as sensed in whole or in part by the sensor assembly and determines the amount of energy that can be extracted from within the cylinder in order to convert the water to steam.

b) calculates the amount of water to be injected based on the previously determined "energy content" as well as the temperature of the water being injected before it enters the cylinder.

c) regulates and/or activates the injector structures 48 so as to inject the correct quantity of water periodically preferably beginning at the end of the third stroke and possibly continuing during a portion or at least a majority of the fourth stroke, using one or more injector structures 48 associated with each cylinder.

d) prevents the turning of water into steam on an instantaneous basis during the fourth stroke but rather regulates the conversion of water to steam on a controlled basis, substantially continuously over at least a majority of the duration of the fifth stroke, which is defined as the auxiliary power stroke of the six-stroke cycle.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An internal combustion engine designed to operate on a six-stroke cycle, said internal combustion engine comprising:

a) at least one piston and cylinder assembly including a piston reciprocally mounted within a cylinder and intake and exhaust valves cooperatively mounted to regulate fluid flow into and out of said cylinder and an ignition source structured to ignite a combustible mixture within said cylinder, b) a central processor responsive to energy content within said cylinder at least during a first predetermined portion of the six-stroke cycle and operatively connected to an injection assembly, c) said injection assembly disposed and structured to inject a quantity of water into said cylinder during a second predetermined portion of the six-stroke cycle based at least in part on said energy content, d) a first intake stroke wherein said inlet and exhaust valves are respectively opened and closed and during which a combustible fluid enters said cylinder, e) a second compression stroke and a third power stroke wherein said inlet and exhaust valves are closed and during which said combustible fluid is respectively compressed and ignited, f) a fourth compression stroke wherein said intake and exhaust valves are closed and during which water is injected into said cylinder and the water and ignited fluid are compressed, g) a fifth power stroke wherein said intake an exhaust valves are closed and during which the injected water converts to steam, h) a sixth stroke wherein said intake and exhaust valves are respectively closed and opened and during which the steam and ignited fluid are exhausted, and i) said first predetermined portion of the six-stroke cycle comprising a portion of said third stroke and said second predetermined portion of said six-stroke cycle comprising an end of said third stroke and at least a portion of the duration of said fourth stroke.

2. An engine as recited in claim 1 wherein said injection assembly is operatively activated by said central processor to inject the quantity of water into said cylinder periodically beginning at the end of said third stroke and over at least a majority of the duration of said fourth stroke.

3. An engine as recited in claim 1 wherein at least the total energy input to the cylinder, the thermal efficiency of the engine and the percentage of heat loss normally attributed to exhaust gasses are determinative of said energy content.

4. An engine as recited in claim 1 wherein said water supply comprises a water jacket mounted in heat transferring relation to the cylinder.

5. An engine as recited in claim 1 wherein said water supply comprises a substantially closed system including a condenser connected in receiving relation to said exhaust valve and a return pump connected to receive water from said condenser and direct the retrieved water to said water jacket.

6. An engine as recited in claim 5 wherein said closed system further includes an injector pump interconnected in fluid communication between said water jacket and said water injection assembly.

7. An engine as recited in claim 1 wherein said injection assembly comprises at least one injector structure operatively connected to said central processor and structured to inject water into said cylinder.

8. An engine as recited in claim 7 wherein said sensor assembly comprises at least two other sensor structures each mounted in heat transferring relation on the engine, whereby the heat of the water being injected into the cylinder and the speed of the engine is determined.

9. An engine as recited in claim 7 wherein said injection assembly comprises a plurality of injector structures each operatively connected to said central processor, whereby a quantity of water is injected by said plurality of injector/structures into the cylinder during said second predetermined portion of the six-stroke cycle.

10. A method of operation of an internal combustion during a six-stroke cycle, said method comprising:

a) drawing a combustible fluid into a cylinder during a first stroke, b) compressing and igniting the combustible fluid respectively during a second stroke, c) determining a quantity of water to be injected by determining the energy content within the cylinder during a portion of a third stroke prior to the injection of water into the cylinder by utilizing the total energy input to the cylinder, the thermal efficiency of the engine and the percentage of heat loss normally attributed to exhaust gasses, d) injecting the quantity of water into the cylinder beginning at the end of the third stroke without exhausting the ignited fluid and compressing the water and ignited fluid during a fourth stroke, e) converting the water into steam while reducing pressure within the cylinder and thereby defining a fifth stroke as a power stroke, and f) exhausting the steam and ignited fluid from the cylinder luring a six-stroke.

11. A method as recited in claim 10 comprising further injecting the quantity of water throughout at least a portion of the duration of the fourth stroke.

12. A method as recited in claim 11 comprising further injecting the quantity of water periodically throughout at least a majority of the duration of the fourth stroke.

13. A method as recited in claim 12 comprising converting the water into steam gradually on a substantially continuous basis throughout a portion of the fifth stroke.

14. A method as recited in claim 13 comprising converting the water into steam throughout at least a majority of the duration of the fifth stroke.

* * * * *